United States Patent

Chuiko et al.

[11] 4,030,940
[45] June 21, 1977

[54] METHOD OF PRODUCING FINE DISPERSE ALKYLATED SILICA COMPOUNDS

[76] Inventors: Alexei Alexeevich Chuiko, Prospekt Nauki 99, kv. 48; Valentin Anatolievich Tertykh, ulitsa Sapernoe pole 9/21, kv. 40; Vilyam Alexandrovich Sobolev, ulitsa P.Lumumby 13, kv. 12; Valery Mikhailovich Maschenko, ulitsa Oktyabrskoi revoljutsii, 17/5, kv. 11; Vyacheslav Valentinovich Pavlov, ulitsa K.Libknekhta, 22, kv. 7; Alexei Dmitrievich Chugai, ultisa Gvardeiskaya, 4, all of, Kiev; Nikolai Vasilievich Khaber, ulitsa Sevastopolskaya, 4, kv. 6; Anatoly Borisovich Kondratenko, ulitsa Nikolaevoi-Tereshkovoi, 30, both of Kalush, Ivano-Frankovskoi oblasti; Vasily Ivanovich Vatamanjuk, ulitsa Sovetskaya, 98, kv. 16, Ivano-Frankovsk; Mikhail Ivanovich Khoma, ulitsa Sevastopolskaya, 8, Kalush, Ivano-Frankovskoi oblasti; Alexandr Nikolaevich Kutin, ulitsa Polyarnaya, 20, kv. 8, Moscow; Jury Davydovich Shaposhnikov, ulitsa Scherbakovskaya, 5, kv. 153, Moscow; Malvina Leontievna Galashina, 3 Frunzenskaya ulitsa 1, kv. 91, Moscow, all of U.S.S.R.

[22] Filed: Nov. 3, 1975

[21] Appl. No.: 628,243

[52] U.S. Cl. .............. 106/308 Q; 106/288 Q; 106/288 B; 106/309; 427/213; 427/220
[51] Int. Cl.$^2$ .................................. C09C 1/28
[58] Field of Search .......... 106/308 Q, 288 Q, 309; 427/213, 220

[56] References Cited

UNITED STATES PATENTS

| 3,873,337 | 3/1975 | Läufer et al. | 106/308 Q |
| 3,920,865 | 11/1975 | Läufer et al. | 427/220 |
| 3,924,029 | 12/1975 | Schutte et al. | 106/308 Q |

FOREIGN PATENTS OR APPLICATIONS 1,163,784   1964   Germany

Primary Examiner—Winston A. Douglas
Assistant Examiner—J. V. Howard

[57] ABSTRACT

A method of producing fine-disperse alkylated silica compounds, characterized in that starting fine-disperse silica is subjected to treatment with water vapors at a temperature of 110°–120° C to attain the humidification degree of from 2 to 40 micromoles $H_2O/m^2$ $SiO_2$, the thus humidified silica being then treated with vapors of alkylchlorosilane at a temperature of 250° to 310° C. The method of the invention allows controlling the concentration of grafted alkyl groups in the resultant product within the range of from 4.7 to 8.0 micromoles of grafted alkyl groups per $m^2$ of the surface of $SiO_2$. Starting silica can be modified with oxides of metals, such as aluminium, titanium, iron or zirconium oxides, the resultant products exhibiting good hydrophobic properties when used as thickeners for lubrication materials.

6 Claims, 1 Drawing Figure

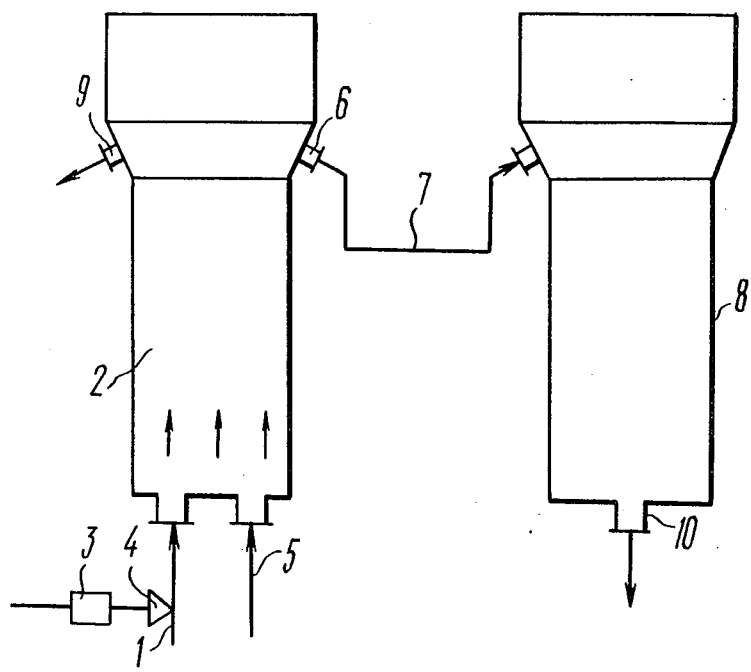

METHOD OF PRODUCING FINE DISPERSE ALKYLATED SILICA COMPOUNDS

The present invention relates to the synthesis of organosilicon compounds and more particularly to methods of producing fine-disperse alkylated silica compounds.

The term "fine-disperse alkylated silica compounds" is used here and hereafter to denote alkylated silica compounds having a highly developed specific surface from 180 to 380 m$^2$/g SiO$_2$. Said alkylated silica compounds find wide application in various branches of industry as fillers for rubber mixes, thickeners for varnishes, paints and greases, and also as additives preventing agglomeration of hygroscopic loose materials. As a particular example, dusting of ammonium nitrate with alkylated silica can be cited. The use of alkylated silica compounds as thickeners of plastic greases allows a substantial increase in the thermostability, water-resistance of filled lubrication compositions, and application of said compounds as fillers for adhesive compositions is conducive to a substantial improvement in the properties of the latter.

Known in the art is a method of producing fine-disperse alkylated silica compounds- aerosils- by treating fine-disperse silica in a fluidized bed with vapours of dimethyldichlorosilane at a temperature of 400° C for a period of 0.5 hour with subsequent isolation of the resultant alkylated silica from gaseous reaction products at a temperature of 390° to 400° C. With said prior-art method, however, screening of the surface of silica particles with chemically grafted alkyl groups is neither uniform, nor sufficient, since dimethyldichlorosilane reacts only with hydroxyl groups located on the surface of silica. The maximum attainable concentration of grafted alkyl groups with the use of said prior-art method is therefore determined by the content of hydroxyl groups on the surface of silica and usually amounts to about 2.7 micromoles of groups $>$ Si(Ch$_3$)$_2$ per m$^2$ of the SiO$_2$ surface. Such silica fails to meet users' requirements. It cannot be used in most of the above-stated fields, e.g. as a filler of organo-silicon rubbers. Its incorporation into rubber brings about premature structuration of the rubber mix and, hence, to the loss of technological properties thereof. The application of said silica as a thickener of disperse media, such as greases, leads to their breaking-up. A problem thus arises of improving the properties of alkylated silica compounds so that they could meet ever increasing industrial requirements.

Moreover, high temperture (about 400° C) and long time (about 0.5 hour) required for the reaction create technological difficulties for running the process in such high-efficiency apparatus as fluidized bed reactors.

It is an object of the present invention to provide alkylated silica with an increased concentration of grafted alkyl groups in and high dispersion degree of the product.

Another object of the invention is to provide such a method of producing fine-disperse alkylated silica, which would give a product with a high concentration of grafted alkyl groups.

A further object of the invention is to provide a method of producing fine-disperse alkylated silica, which would allow controlling the concentration of grafted alkyl groups so as to make the product fit for various particular applications.

A still further object of the invention is to provide a method of producing fine disperse alkylated silica under conditions energetically more favourable than those of the prior-art method.

Yet another object of the invention is to provide a method of producing alkylated silica, which allows modification of the product surface so as to impart high hydrophobicity as well as increased thickening power thereto.

Said and other objects are accomplished by the provision of a method of producing fine-disperse alkylated silica, which method, according to the invention, comprises the steps of treating starting fine-disperse silica with water vapours at a temperature of 110° to 120° C for humidifying said silica to a degree of 2 to 40 micromoles H$_2$O/m$^2$ SiO$_2$; treating the thus humidified silica with vapours of alkylchlorosilane in a fluidized bed at a temperature of 250° to 310° C; and isolating the resultant fine-disperse product from gaseous reaction products at a temperature of 390° to 400° C.

The method of our invention allows varying the degree of grafting alkyl groups to the surface of silica, whereby alkylated silica compounds with desired properties can be produced.

For producing fine-disperse alkylated silica with the degree of grafting alkyl groups to the surface thereof equal to 4.7 micromoles per m$^2$ SiO$_2$, humidification of silica is conducted till the value of 2 micromoles H$_2$O/m$^2$ SiO$_2$ is reached. This degree of graftng renders alkylated silica adequately hydrophobic for use as an anti-agglomerant for dusting ammonium nitrate and as a filler for varnishes and paints.

For producing fine-disperse alkylated silica with the degree of grafting alkyl groups to the surface thereof equal to 6.7 micromoles per m$^2$ SiO$_2$, humidification of silica is conducted till the value of 20 micromoles H$_2$O/m$^2$ SiO$_2$ is reached. This degree of grafting renders alkylated silica highly hydrophobic, so that the resultant product is fit for use as a thickener for plastic greases.

For producing fine-disperse alkylated silica with the degree of grafting alkyl groups to the surface thereof equal to 8 micromoles per m$^2$ SiO$_2$, humidification of silica is conducted till the value of 40 micromoles H$_2$O/m$^2$ SiO$_2$ is reached. This degree of grafting renders alkylated silica maximum hydrophobic, so that the resultant product is fit for use as a filler for silicane rubber without employing any stabilizing additives.

According to the present invention, said silica can be modified with oxides of metals, such as Al, Fe, Ti, Zr, whereby additional introducing of active centres into the surface layer becomes possible. The preferable range of said metal oxides in the product is 0.5 to 5 wt. %, since with a lower percentage of any of said oxides the required thickening power of the product, e.g. for using it as a thickener for greases, will not be attained, whereas a higher percentage of said modifying metal oxides in the product will render the surface of alkylated silica more hydrophilic.

Humidification of silica leads to the formation of a hydrate layer on the surface of silica particles. When humidified silica is treated with vapours of alkylchlorosilane, this hydrate layer first hydrolyzes ≡ Si-Cl groups of alkylchlorosilane to ≡ Si-OH groups which are then capable of reacting with the hydroxyl groups on the surface of silica under less forcing conditions, namely during a period of 5 to 15 minutes and at a temperature of 250° to 310° C. Due to the humidification of silica within said range, namely, from 2 to 40 micromoles $H_2O/m\ SiO_2$, the concentration of grafted alkyl groups can be controlled, so that the resultant product will feature desired degrees of grafting said groups as stated above. Humidification of silica within a range other than specified above fails to give desired results, since humidification of silica with water vapours to a value below 2 micromoles is not sufficient for creating a hydrate layer, this resulting in high reaction temperatures (about 400° C) with the ensuring additional energy requirements; on the other hand, humidification of silica with water vapours to a value above 40 micromoles leads to the formation of polymolecular layers of water on silica and the alkylation reaction is thereby rendered uncontrollable.

Humidification of silica within the above-specified range also makes it possible to reduce the temperature of the alkylation reaction from 400° to 250° C and the reaction time from 0.5 to 0.25 hour. Under such conditions the process of producing fine-disperse alkylated silica can be conducted in technologically simple high-efficiency fluidized bed reactors.

For solving a number of industrial problems, such as producing thickeners for lubricating compositions, alkylated silica should feature not only a high concentration of alkyl groups chemically grafted to its surface, but also additional active centres thereon, which contribute to thickening of disperse media.

As stated above, this object is accomplished by modifying the composition of fine-disperse silica with oxides of such metals as aluminium, titanium, iron and zirconium, the corresponding metal oxide or a mixture thereof being introduced at the stage of producing fine-disperse alkylated silica.

As is apparent from the above-stated, the method of the present invention offers the following advantages:

1. The process of alkylating silica can be conducted in fluidized bed reactors during a period of 5 to 15 minutes at 250°–310° C, the process time being thus reduced at least twice and the process temperature by at least 100° C as compared with the prior-art method.

2. The concentration of grafted alkyl groups can be controlled, whereby the range of the resultant product and, hence, the fields of application thereof, can be broadened, no such effect being attainable with the prior-art method.

3. The present method allows producing alkylated silica compounds with the concentration of grafted alkyl groups up to 8.0 micromoles $Si(R)_n/m^2\ SiO_2$, such alkylated silica being fit for use as a structure-formation inhibiting filler for silicone rubbers without employing stabilizing additives, whereas alkylated silica produced in accordance with the prior-art method cannot be used for filling silicone rubbers without stabilizing additives.

4. The method of the present invention allows producing the product, preserving its fine-disperse structure and attaining a high degree of screening the surface of silica by chemically grafted alkyl groups.

5. Modification of the surface of alkylated silica with oxides of metals, such as Al, Fe, Ti, Zr, or with a mixture of said metal oxides, imparts the product, its high hydrophobic properties being preserved, with an enhanced thickening power in disperse media. This makes the resultant product applicable as a thickener of lubricating compositions for use in units subject to friction under particularly heavy-load and high-temperature-operation conditions.

A detailed description of the herein-proposed method of producing fine-disperse alkylated silica is given hereinbelow with referenece to the accompanying drawing in which the principle flow-sheet of the process is shown.

Referring now to the drawing, fine-disperse silica or fine-disperse silica modified with metal oxides is continuously fed through pneumatic conveyor 1 to the bottom portion of reactor 2. Before feeding silica to reactor 2, said silica is humidified with vapours of water at a temperature of 110°–120° C, humidification being carried out by means of batching pump 3 and injector 4 fitted with a heater (not shown in the drawing). Silica is humidified to the value selected to lie within the range of 2 to 40 micromoles $H_2O/m^2\ SiO_2$, said value being ensured by batching pump 3. Vapours of water atomized by injector 4 are sorbed on the surface of the fine-disperse silica particles. The injection conditions are so selected that the silica particles be in suspended state, i.e. that the fluidized bed condition be met. Simultaneously with feeding silica particles into the bottom portion of reactor 2, vapours of alkylchlorosilane are continuously fed into the bottom part of said reactor along pipeline 5.

In reactor 2 the humidified silica particles are mixed with the alkylchlorosilane vapours and react therewith at a temperature of 250° to 310° C during a period of 5 to 15 minutes. The stream of the resultant alkylated silica comes to the upper wider portion of reactor 2, where said stream becomes decelerated, partially separated from gaseous reaction products, and, through pipe 6 along pipeline 7 is directed to desorber 8. The gaseous reaction products are removed from the upper portion of reactor 2 through pipe 9. In desorber 8 wherein a temperature of 390° to 400° C is maintained the gaseous reaction products are completely desorbed from the surface of the particles of alkylated silica or modified form thereof. From desorber 8 the finished alkylated silica is delivered through pipe 10 and directed to vacuum-compacting and packaging stages (not shown).

The starting fine-disperse silica is produced by using such conventional method as burning vapours of silicon tetrachloride in an oxyhydrogen torch.

For a better understanding of the present invention, specific examples of its emobidment are given hereinbelow by way of illustration with reference to the accompanying drawing.

Example I

Starting fine-disperse silica (aerosil) having a specific surface of 300 $m^2/g\ SiO_2$ is continuously fed at a rate of 30kg/hr in a stream of nitrogen through pneumatic conveyor 1 into the bottom portion of reactor 2. With the aid of pump 3 and injector 4 water vapours are continuously supplied into pipeline 1 at a rate of 0.5 lit/hr at a temperature of 110° to 120° C, whereby humidification of fine-disperse silica to 2 micromoles $H_2O/m^2\ SiO_2$ is ensured. Vapours of dimethyldichlorosilane are continuously fed into the bottom portion of reactor 2 at a rate of 10 kg/hr through pipeline 5. In reactor 2 under fluidized bed conditions at a temperature of 310° C dimethylchlorosilane reacts with humidified silica during a period of 5 minutes, giving methylated silica, this compound coming from the upper portion of reactor 2 into desorber 8. The resultant finished methylated silica has the concentration of chemically grafted methyl groups equal to 4.7 micromoles > $Si(CH_3)_2/m^2$ $SiO_2$.

Example 2

Fine-disperse alkylated silica is produced by following a procedure similar to that described in Example I, the difference residing in that starting silica having specific surface of 300 m²/g $SiO_2$ is fed continuously at a rate of 30 kg/hr and water vapours are fed at a rate of 5 lit/hr, this ensuring humidification of the starting silica equal to 20 micromoles $H_2O/m^2$ $SiO_2$. The reaction of silica with vapours of dimethyldichlorosilane in reactor 2 at a temperature of 270° C for 10 minutes gives methylated silica with the concentration of chemically grafted methyl groups equal to 6.7 micromoles > $Si(CH_3)_2m^2$ $SiO_2$.

Example 3

Fine-disperse methylated silica is produced by following a procedure similar to that described in Example I, the difference being in that water vapours for the humidification of silica are fed at a rate of 10 lit/hr, this ensuring humidification of the surface of silica particles to the value of 40 micromoles $H_2O/m^2$ $SiO_2$. The reaction of silica with vapours of dimethyldichlorosilane in reactor 2 at a temperature of 250° C during 15 minutes gives methylated silica with the concentration of chemically grafted methyl groups equal to 8.0 micromoles > $Si(CH_3)_2/m^2$ $SiO_2$.

Example 4

Silica modified with aluminium oxide is prepared by burning silicon tetrachloride and aluminium chloride taken in a weight ratio of 99.6:0.5 in an oxyhydrogen torch. The thus modified silica containing about 0.5 wt.% of aluminium oxide is fed into the bottom portion of reactor 2, where said silica undergoes all the stages of treatment described in any of the above Examples I, 2 or 3. The resultant alkylated silica features concentrations of grafted methyl groups of 4.7 micromoles, 6.7 micromoles or 8 micromoles > $Si(CH_3)_2/m^2$ $SiO_2$.

Example 5

Fine-disperse silica modified with aluminium oxide is prepared by following a procedure similar to that described in Example 4, the difference being in that silicon tetrachloride and aluminium chloride are taken in a weight ratio of 94.8:5.8.

The thus modified silica contains 5 wt.% of aluminium oxide This silica is then subjected to all the stages of treatment described in Examples I, 2 and 3. The resultant finished product has the concentration of grafted methyl groups equal to 4.7, 6.7 or 8.0 micromoles $Si(CH_3)_2/m^2$ '$SiO_2$.

Alkylated silica compounds modified with iron, titanium or zirconium oxides or with mixtures thereof are produced by following the procedures similar to those described in Examples 4 and

What is claimed is:

1. A method of producing fine-disperse alkylated silica and controlling the concentration of grafted alkyl groups on said silica, comprising the steps of treating fine-disperse silica with vapours of water at a temperature of 110°–120° C to a humidification degree ranging from 2 to 40 micromoles $H_2O/m^2$ $SiO_2$; treating the thus humidified fine-disperse silica with vapours of alkylchlorosilane at a temperatue of 250°–310° C in a fluidized bed; isolating the resultant fine-disperse aklylated silica from gaseous reaction products at a temperature of 390°–400° C.

2. A method as claimed in claim I, wherein for producing fine-disperse alkylated silica with the degree of grafting alkyl groups equal to 4.7 micromoles per m² $SiO_2$, humidification of silica is conducted to the value of 2 micromoles $H_2O/m^2$ $SiO_2$.

3. A method as claimed in claim 1, wherein for producing fine-disperse alkylated silica with the degree of grafting alkyl groups equal to 6.7 micromoles per m² $SiO_2$, humidification of silica is conducted to the value of 20 micromoles $H_2O/m^2$ $SiO_2$.

4. A method as claimed in claim I, wherein for producing fine-disperse alkylated silica with the degree of grafting alkyl groups equal to 8 micromoles per m² $SiO_2$, humidification of silica is conducted to the value of 40 micromoles $H_2O/m^2$ $SiO_2$.

5. A method as claimed in claim I, wherein silica modified with metal oxides is used as fine-disperse silica.

6. A method as claimed in claim 5, wherein the content of said modifying metal oxides or of a mixture thereof in the fine-disperse silica is 0.5 to 5 wt.%.

* * * * *